Jan. 24, 1967   W. R. WALTERS ETAL   3,299,817
ABOVE GROUND LIQUID LEVEL CONTROL
Filed April 28, 1964   2 Sheets-Sheet 1

William R. Walters
William D. Conner
INVENTORS

BY Clarence A. O'Brien
and Harvey B. Jacobson
Attorneys

Jan. 24, 1967  W. R. WALTERS ET AL  3,299,817
ABOVE GROUND LIQUID LEVEL CONTROL
Filed April 28, 1964  2 Sheets-Sheet 2

William R. Walters
William D. Conner
INVENTORS

BY *Clarence A. O'Brien*
and *Harvey B. Jacobson*
Attorneys

3,299,817
ABOVE GROUND LIQUID LEVEL CONTROL
William R. Walters, 1300 Sunset, Pawhuska, Okla. 74056, and William D. Conner, Pawhuska, Okla. (3689 Virginia Ave., Lynwood, Calif. 90363)
Filed Apr. 28, 1964, Ser. No. 363,189
3 Claims. (Cl. 103—25)

The present invention generally relates to a liquid level control device and more particularly to such a device adapted to be used with submersible or centrifugal type pumps employed in domestic water systems and the like and is more particularly related to a control that is installed and operates completely above ground thereby enabling it to be installed in substantially any existing water system.

An object of the present invention is to provide a liquid level control including a sensing element in the form of a flap valve disposed in a liquid flow line to sense the flow or static condition of liquid in the line with the flap valve being operatively connected to a cam structure for operating a switch for controlling operation of a pump motor in response to the presence or absence of liquid flow in the line.

Another object of the present invention is to provide a liquid level control in the form of a cam operating flap valve which senses the presence and absence of liquid flow together with a novel control mechanism for operating the pump a predetermined length of time after the flap valve has sensed the absence of flow in the liquid line and thereafter turning off the pump motor but again restarting the pump motor after a predetermined time elapsed with the flap valve subsequently sensing the presence or absence of flow and permitting operation of the pump motor or stopping the pump motor in the absence of liquid flow and the like.

Still another object of the present invention is to provide a liquid level control adapted to be installed in various liquid flow lines but primarily intended for use in domestic water systems in which a submersible or centrifugal type of pump is employed with the control system of the present invention adapted to be installed completely above ground in order to facilitate the installation thereof and in order to enable easier adjustment of the controls, maintenance of the components and the like thereby providing a relatively inexpensive construction which is simple, trouble free and generally efficient for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
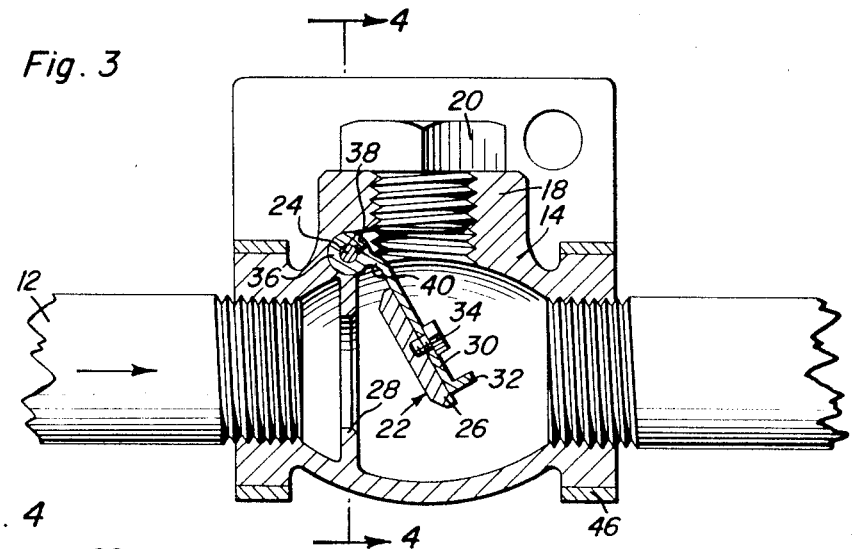
FIGURE 3 is a longitudinal, sectional view taken substantially upon a plane passing along section line 3—3 of FIGURE 1 illustrating further structural details of the flap valve structure.
Figure 4:
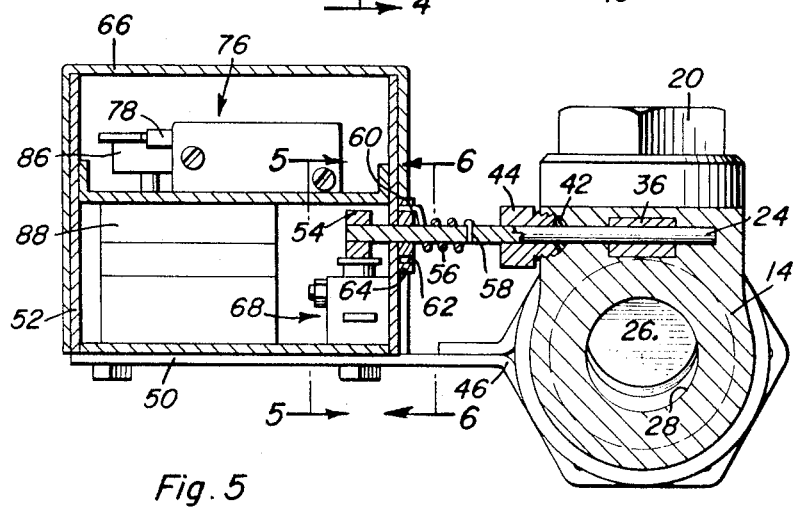
FIGURE 4 is a transverse, sectional view taken substantially upon a plane passing along section line 4—4 of FIGURE 3 illustrating further structural details of the control mechanism.
Figure 5:
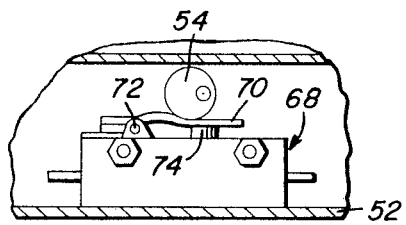
FIGURE 5 is a detailed sectional view taken substantially upon a plane passing along section line 5—5 of FIGURE 4 illustrating the cam structure for operating a switch in the control system.
Figure 6:
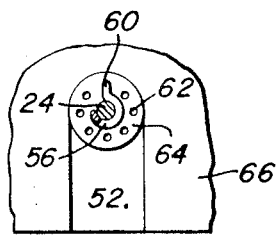
FIGURE 6 is a detailed sectional view taken substantially upon a plane passing along section line 6—6 of FIGURE 4 illustrating further structural details of the spring mechanism for urging the flap valve to closed position.

Referring now specifically to the drawings, the control of the present invention is generally designated by the numeral 10 and is installed in a liquid flow pipe 12 which is the discharge pipe of a pump such as a submersible or centrifugal pump in a domestic water supply. The structure of the pump is not illustrated in that it forms no part of the present invention except for its association with the control apparatus as defined hereinafter. The pipe 12 is connected to the pump in any suitable manner and the flow of water is in the direction of the arrow in FIGURE 3. The control apparatus 10 includes a fitting 14 or valve body which is interposed in the line 12 by suitable screw-threaded connections 16 or any other suitable fastening means for securing the fitting in place and in communication with the flow line 12. The fitting 14 includes an internally threaded boss 18 having a closure plug 20 threaded therein to provide access to the interior of the fitting for enabling removal of and replacement of a flap valve structure generally designated by numeral 22 which is pivotally supported from a horizontally disposed support shaft 24 and includes a valve member 26 adapted to seat against an annular valve seat 28 formed integral with the fitting 14 with the valve member 26 and the valve seat 28 including corresponding bevelled or inclined surfaces for sealing engagement. The valve member 26 includes a mounting plate 30 having a projection 32 forming an abutment stop engageable with the valve body 14 for limiting the outward swinging movement of the valve 22 away from the valve seat 28. A threaded fastener 34 is provided for detachably securing the valve member 26 to the plate 30 and the plate 30 is provided with a sleeve 36 mounted on the shaft 24 for rotation therewith by a suitable set screw 38 or the like which is accessible through the threaded fitting 18 when the plug 20 is removed thereby enabling the components of the valve 22 to be released from the shaft 24 so that the components of the valve may be removed and replaced.

As will be apparent, the flap valve 22 is gravity operated and the plate 30 is provided with an offset at 40 in order to assure that gravity will normally close the flap valve against the valve seat. As liquid flows in the direction of the arrow in FIGURE 3, the liquid flow will cause the flap valve 22 to move away from the valve seat 28 to the position illustrated somewhat in FIGURE 3. When there is no liquid flow or if only air flows through the line 12 at a relatively low velocity, gravity will cause the flap valve 30 to close thus rotating the shaft 24 in response to or absence of liquid flow in the flow line 12. The flap valve 22 also serves as a check valve to prevent reverse flow in the event of a back flow in the flow line 12. Where the shaft extends through the fitting 14, there is provided a seal ring 42 and a packing nut 44 which will prevent leakage around the rotatable shaft 24.

Attached to the fitting 14 is a pair of clamp brackets 46 secured in place by clamp screws 48 and including laterally extending supporting lugs 50 for a switch housing 52. The shaft 24 extends into the interior of the switch housing 52 and has a radial cam 54 attached to the end thereof disposed interiorly of the casing 52. Mounted on the shaft 24 between the housing 52 and the fitting 14 is an axial coil spring 56 having one end thereof extending diametrically of the shaft as indicated by numeral 58 and received in a transverse opening in the shaft 24. The other end of the spring 56 extends laterally and terminates in a longitudinally extending finger or lug 60 that is detachably received within one of the series of apertures 62 in a circular plate 64 that is rigid with the casing 52 thereby enabling the tension of the spring 56 to be adjusted. The spring 56 normally biases the flap valve 22 to closed position by torsionally resisting rotation of shaft 24 and retains it in closed position until the liquid pressure in the flow line 12 overcomes the tension of the spring 56. Thus, by varying the tension of the spring 56, the characteristics of the liquid flow sufficient to move the flip valve 22 may be effectively adjusted.

The aforementioned described structure forms a cam operating valve that moves in response to liquid flow in the flow line and the casing 52 is weather proof in that it is provided with a removable cover 66 that is retained in position in any suitable manner. Mounted within the housing or casing 52 is a micro switch structure generally designated by numeral 68 which is of conventional configuration and it includes an operating lever 70 engaged by the radial cam 54. The lever 70 is pivotally mounted on a pivot support 72 and engages the plunger 74 of the micro switch. The switch 68 is in normally closed position when the cam 54 is not operating the same but when the flap valve 22 swings to a closed position due to the absence of flow in the flow line, the cam 54 will serve to operate the lever 70 thus opening the contacts in the switch 68 for opening the circuit in which the switch 68 is incorporated.

Also mounted in the casing 52 is a second micro switch 76 having a pivotal operating arm or lever 78 engaging a plunger 80. The outer end of the operating lever 78 is extended laterally as at 82 for engagement in one of a plurality of notches 84 formed in the periphery of a circular operating disk 86 that is driven from a time clock structure 88 which includes a motor 90. Also incorporated into the casing 52 is a terminal block or board 92 having a plurality of terminals 94 thereon to which the various electrical components are connected in a particular assembly, as described hereinafter. A suitable source of electrical energy may be provided for the control systems such as a conventional 110 volt power supply or a low voltage system may be provided as desired. The switch 76 is also normally closed when the end 82 of the lever 78 is in a notch 84 but when the disk 86 rotates, the periphery of the wheel 86 between the notches 84 will engage the lever 78 thus actuating the switch 76 to open and de-energize the circuit in which it is connected.

Figure 1:
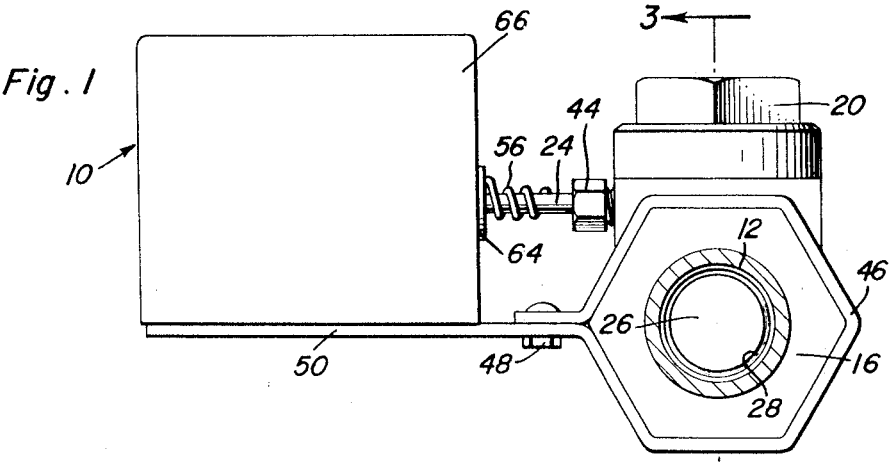
FIGURE 1 is an elevational view of the liquid level control of the present invention.
Figure 2:
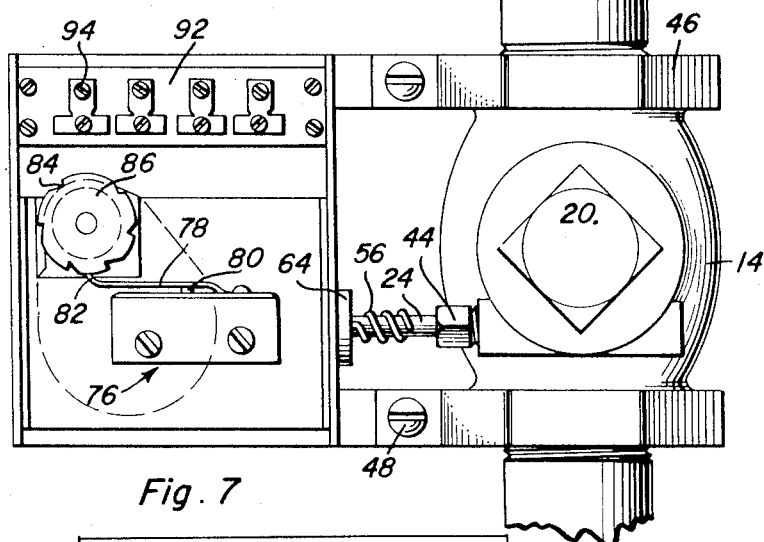
FIGURE 2 is a plane view of the construction of FIGURE 1 with portions of the housing removed illustrating the structure thereof.
Figure 7:
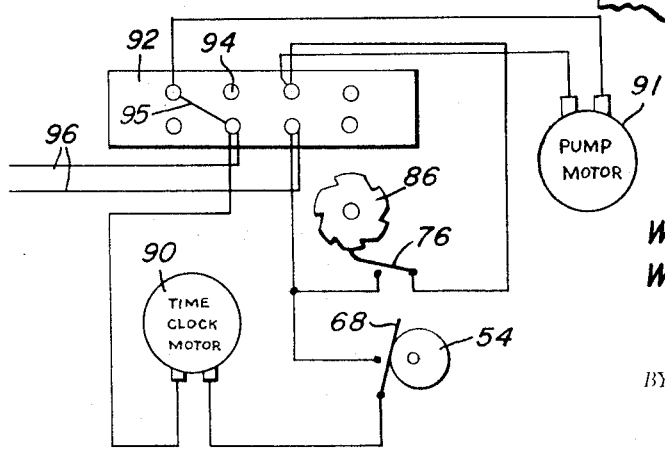
FIGURE 7 is a schematic wiring diagram of the electrical circuit incorporated into the present invention.

Switches 68 and 76 are in normally closed position and when current is fed through the lines 96 such as in response to a pressure operated switch in a domestic water supply system, both the clock motor 90 and pump motor 91 shown schematically in FIGURE 7 will start immediately. Toward this end, the power lines are connected respectively to the terminals on the block 92 to which the motor 90 and switch contacts of switches 68 and 76 are connected. Switch 68 thereby connects the motor 90 across the power lines 96 through the power terminals while switch 76 connects one of the lines 96 through another terminal to motor 91. The other power terminal is connected by jumper 95 and yet another terminal to the motor 91 to complete its circuit through switch 76. As fluid is pumped against the cam operating valve, it will turn the cam 54 sufficient to open contacts on the switch 68 to stop operation of the time clock motor 90 leaving switch 76 in closed position to allow the pump to continue to operate. When the pump draws in air, it will allow the fluid to become static thereby allowing the cam shaft spring 56 and gravity to close the cam operating valve which allows switch 68 to return to a normally closed position. This will start the time clock motor 90 again and drive the operating disk 86 so that the lever 78 on switch 76 will be forced out of a notch 84 after elapse of a predetermined number of seconds and thereby open the contacts on switch 76 which will stop current flow to the pump motor thereby stopping the pump. Since the switch 68 is in closed position, the time clock motor will continue to run for a predetermined amount of time until the lever 78 on the switch 76 drops into the next notch 84 on the operating disk 86 which will restart the pump. If restarting the pump restarts flow of liquid, the control will return to normal operation stopping the operating disk 86 in a switch closing position. However, if restarting the pump does not return normal flow of liquid in a predetermined amount of time, the disk 86 which has continued to turn will stop the pump motor until the next notch 84 is reached at which time the pump again will be restarted and this recycling will continue until pump restarting results in liquid flow in the flow line. Thus, the switch 76 actually controls operation of the pump motor while the switch 68 which is cam operated controls the operation of the time clock motor with the time clock motor being rendered inoperative as long as liquid flow occurs and the flap valve 22 is held in open position by liquid flow and the switch contacts and switch 68 are open. As soon as liquid flow stops, the spring operated cam shaft will return to a closed position thus closing the contacts in switch 68 and energizing the time clock motor thereby cycling the pump motor in response to movement of the lever 78 into and out of the notches 84 which cycling will continue until such time as liquid flow in the line is restarted or the power supply is cut off.

This control is adapted to be mounted above ground for controlling a submersible or centrifugal type of water pump such as normally found in domestic water supply systems but it may be incorporated into various systems where it is desired to eliminate continuous operation of a pump when the pump is no longer pumping a fluid. The sensitivity of the device may be adjusted and the device may be installed in various angular orientations inasmuch as the cam shaft spring will serve to return the flap valve 22 to its closed position even though it may not be assisted by gravity thereby enabling the device to be versatile in installation and enabling it to be installed in the most desirable location. The control may operate on conventional household current or a low voltage may be provided if desired depending upon the installation. The electrical components such as the switches, terminal block, time clock are all conventional components and the details are not shown inasmuch as such details do not define part of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a pump motor, a device for controlling operation of the pump motor in accordance with liquid flow conditions in a flow line comprising, flow responsive valve means in said line displaceable between a flow blocking and open position, a timer motor, intermittent switch means driven by the timer motor for periodically deenergizing the pump means in response to energization of the timer motor, cam operated switch means actuated by the flow valve means for deenergizing the timer motor in response to movement of the flow responsive valve to said open position, and means biasing the flow responsive valve means to the flow blocking position for energizing the timer motor and blocking the flow line in the absence of liquid flow through the flow line, said cam operated switch means being mounted adjacent to the flow responsive valve means closely spaced from the flow line and including a normally closed switch contact, a cam element in engagement with the contact and an actuating shaft connecting the cam element to the flow responsive valve means, said flow responsive valve means including a valve body in the flow line forming an enlarged cavity, a valve seat mounted within the valve body and a flap element pivotally mounted by the valve body and connected to said actuating shaft.

2. The combination of claim 1 including a housing containing both of said switch means and the timer motor and a pair of clamp brackets supporting the housing on the valve body in spaced relation thereto, said actuating shaft extending from the valve body into the housing.

3. The combination of claim 2 wherein said biasing means comprises a coil spring mounted on the actuating shaft between the valve body and the housing, opposite ends of the coil spring being respectively anchored to the housing and the actuating shaft.

References Cited by the Examiner

UNITED STATES PATENTS

| | | | |
|---|---|---|---|
| 2,203,331 | 6/1940 | Hinsch | 200—81.9 |
| 2,293,574 | 8/1942 | Teach et al. | 200—81.9 |
| 2,388,843 | 11/1945 | Harvuot | 200—81.9 |
| 2,403,938 | 7/1946 | Macan | 200—91.9 |
| 2,421,768 | 6/1947 | Voliazzo | 200—81.9 |
| 2,604,561 | 7/1952 | Simon | 200—82.3 |
| 2,947,931 | 8/1960 | Hubby | 103—25 |
| 2,981,195 | 4/1961 | Payne et al. | 103—25 |
| 3,072,059 | 1/1963 | Heffel | 103—25 |
| 3,148,622 | 9/1964 | Le Van et al. | 103—25 |

DONLEY J. STOCKING, *Primary Examiner.*

SAMUEL LEVINE, MARTIN P. SCHWADRON,
*Examiners.*

W. L. FREEH, *Assistant Examiner.*